United States Patent [19]

Pohlmann

[11] 3,726,915

[45] Apr. 10, 1973

[54] PHTHALIC ACID PURIFICATION WITH COPPER ACTIVATED PALLADIUM ON CARBON CATALYSTS

[75] Inventor: Hans P. Pohlmann, Highland, Ind.

[73] Assignee: Standard Oil Company, Chicago, Ill.

[22] Filed: July 13, 1970

[21] Appl. No.: 54,568

[52] U.S. Cl..................................260/525, 252/447
[51] Int. Cl...........................C07c 51/42, B01j 11/16
[58] Field of Search......................252/447, 474, 413; 260/525

[56] References Cited

UNITED STATES PATENTS

| | | | |
|---|---|---|---|
| 2,802,889 | 8/1957 | Frevel et al. | 252/474 |
| 3,542,863 | 11/1970 | Zimmerschied | 252/447 |
| 2,911,357 | 11/1959 | Myers et al. | 252/466 |
| 3,442,973 | 5/1969 | Sinfelt et al. | 252/474 |
| 3,134,732 | 5/1964 | Kearby et al. | 252/472 |
| 3,058,997 | 10/1964 | Taylor et al. | 260/525 |

*Primary Examiner*—Patrick P. Garvin
*Assistant Examiner*—P. E. Konopka
*Attorney*—Arthur G. Gilkes, William T. McClain and Fred R. Ahlers

[57] ABSTRACT

Elemental noble metals of the platinum group as reduction catalysts are known from the work of E. B. Maxted and A. Marsden reported in J. Chem. Soc. (1940) pages 469–474 to tend to be deactivated by copper. However the alloying of copper with palladium deposited on carbon in the respective weight ratio of less than 0.5:1.0 substantially enhances the catalytic activity of that palladium reduction catalyst especially the selective reduction of formylbenzoic acid impurities in crude phthalic acid products.

3 Claims, No Drawings

PHTHALIC ACID PURIFICATION WITH COPPER ACTIVATED PALLADIUM ON CARBON CATALYSTS

BACKGROUND OF THE INVENTION

Netherlands Patent Application No. 64-03348 published Sept. 30, 1964 describes the purification of crude terephthalic acid especially such crude terephthalic obtained by the catalytic liquid phase oxidation of p-xylene with molecular oxygen (e.g. air) by catalytic hydrogen treatment of aqueous solutions of crude acid in the presence of a catalyst which is palladium deposited or extended on the surface of carbon support wherein said metal is 0.1–10.0 weight percent of the total catalyst weight. Such treatment through the reduction of 4-formylbenzoic acid (the main impurity), characteristically yellow compounds having the benzil, fluorenone and anthraquinone type structure and other color bodies and color former impurities provides a solution after separation from catalyst from which the uniquely high purity (99.9 percent and higher) fiber-grade quality terephthalic acid can be recovered in a simple manner by exercise of physical controls on temperatures involved in crystallizing and separating crystalline terephthalic acid product from the aqueous medium. The same technique is effective for converting similar crude isophthalic acid and ortho phthalic acid to high quality products.

Coworkers have found ineffective for such catalytic hydrogen treatment the Pd/C catalysts which have a substantial proportion of the palladium crystallites of a size greater than 35–50 A (crystallite diagonal lengths), the smaller size active palladium crystallites i.e., below 35 A) tend to grow to the relatively inactive large crystallites of above 50 A in size slowly upon heating to a temperature in the range of 200°–450°C. and rapidly at temperatures above 450°C. They have found that copper can poison Pd/C catalysts for such hydrogen treating purification when the copper to palladium weight ratio exceeds 0.5:1.0. Such amounts of copper plate and accumulate on the palladium crystallites when there are 1–5 parts per billion of copper in the aqueous solutions of crude terephthalic undergoing the aforementioned purification. Such miniscule amounts of copper can be avoided by demetallizing the water solvent, e.g. by use of an ion exchanger. Sulfur is known to deactivate and even render ineffective for reduction and other catalytic processes the elemental forms of the platinum family of noble metals.

SUMMARY OF THE INVENTION

It has been found that copper based on palladium in Pd/C catalysts in weight ratios below 0.5:1.0, e.g. desirably from 0.4–0.05:1.0 and preferably from 0.3 to 0.1:1.0 not only do not decrease the effectiveness of Pd/C catalysts for the aforementioned purifications but rather increase the activity of Pd/C catalysts for such purposes. This is indeed surprising because the Maxted et al. articles before mentioned tend to demonstrate that catalyst activity of the platinum family is in general diminished by small amounts of copper. Moreover, said enhancing amounts of copper, i.e., in the range of 0.05–0.4 weight part Cu per 1.0 weight part Pd also resist the deactivating effect of sulfur and of thermal crystallite growth and when plated on palladium of Pd/C catalysts whose crystallites are all substantially above 50 A (diagonal length) in size cause a physical change in the large palladium crystallites without any other treatment to a size well below 50 A diagonal length so that a large percentage of said small crystallites are not detectable by X-ray diffraction.

Thus by the use of selective amounts of copper relative to palladium, 0.1 to 0.4:1.0, the Pd/C catalysts can be made to have greater catalytic effectiveness, to resist deactivation by sulfur and to convert by activation such catalysts which would otherwise be relatively inactive because of the presence of large amounts of palladium crystallites of above 50 A size. Such desirable effects are believed to be brought about by the presence of alloys of palladium and copper as are represented by the formulas $CuPd_5$ to $CuPd_6$ in or on the palladium crystallites. Although such alloys were found by X-ray diffraction spectra to be present in the active and activated species of Pd/C catalysts, it is not essential for the understanding and practice of this invention to rely upon the presence of such alloys as the concept for activating or reactivating the Pd/C catalysts.

The benefits of the activation and reactivation of Pd/C catalysts of this invention can be derived in several ways. Fresh catalyst can be prepared by depositing on carbon a solution or paste containing an amount of palladium chloride equivalent to the amount of metallic palladium desired on the finished catalyst in admixture with copper compound reducible to metallic copper in an amount to provide the weight ratio of Cu:Pd in the range of 0.05–0.4:1.0. The composite is dried. The dried composite is reduced with hydrogen gas until no chloride ion is present desirably at a temperature below 450°C. and preferably at 100°–250°C. Also a low activity Pd/C catalyst which has 35 percent or more of the palladium crystallites of a size greater than the minimum detectable by X-ray diffraction (minimum size so detectable are crystallites of 35–50 A diagonal length) can be treated at a temperature of 100°–300°C. with a dilute aqueous solution of a copper compound reducible to metallic copper. The resulting catalyst has substantially all of the palladium crystallites smaller than 35–50 A diagonal size, is exceptionally active and resistive to poisoning by sulfur.

The preferred Pd/C catalysts for phthalic acid purification has a carbon support of high area to mass relationship in the range of 1,000–5,000 square meters per gram ($m^2/g$) and has 0.1 to 10.0, preferably 0.2 to 0.5, weight percent (of total catalyst weight) of metallic palladium on the carbon surface. There should also be low extraneous metals in the carbon support such as in the activated carbons. Coconut charcoal treated to activate by lowering the extraneous metals content is preferred as carbon support.

Illustration of the catalysts of this invention is provided in the following specific examples.

EXAMPLE 1

A Pd/C catalyst containing a total of 0.5 percent palladium by weight on activated coconut charcoal, having 64 percent of Pd on the surface as crystallites of 80 A diagonal length and 36 percent of Pd well dispersed in composite is the starting catalyst. A portion of this catalyst is retained as a point of reference. The remainder of the starting catalyst is treated at 260°C.

with a dilute aqueous solution of $Cu^{+2}$ salt (Cu concentration of 0.5 ppm) and hydrogen at a partial pressure of 100 pounds per square inch (psi) until the catalyst contained a copper: palladium weight ratio of 0.25:1.0. The copper treated catalyst, after drying, was examined by X-ray diffraction and no crystallites as large as 35-50 A were found.

A portion of the heated starting Pd/C catalyst and a portion of the copper treated catalyst (dried) are each heated to 537°-538°C. for 3 hours. The heat treated starting catalyst has about 72 percent of the palladium crystallites with diagonals of 80 A and larger. The heat treated Pd/C catalyst treated with copper had less than 35 percent of the palladium crystallites with diagonals of 35-50 A.

Equal weight portions of the heat treated starting catalyst and copper treated and heat treated catalyst are used for the purification of crude terephthalic acid. For such purification an aqueous solution containing 10 weight percent of crude terephthalic acid obtained from catalytic liquid phase air oxidation of p-xylene is treated with hydrogen at a partial pressure of 100 psi at 276°-277°C. in a flow system wherein the solution and hydrogen flow through a bed of said catalyst. The crude terephthalic acid contained about 0.5 percent 4-formylbenzoic acid and a total of about 1.0 percent impurities. Said heat treated starting catalyst had a first order rate constant of $0.4 \times 10^3$ grams of solution per hour per gram of catalyst but the copper treated starting catalyst had a first order rate constant of $1.7 \times 10^3$ grams of solution per hour per gram of catalyst. The ratio of the first order rate constants of heat treated starting catalyst and copper treated and heat treated starting catalyst: 1.7/0.4 or 4.25, indicates that 4.25 times as much heat treated starting catalyst would be required to achieve the results obtained by the copper and heat treated starting catalysts.

The copper and heat treated catalyst is compared with a standard Pd/C catalyst having 65 percent of the palladium crystallites of below 35-50 A diagonal length for purification of crude terephthalic acid. Equal amounts of each catalyst is subjected to the same total amount of an aqueous solution containing 10 weight percent crude terephthalic acid at a temperature of 276°-277°C., hydrogen partial pressure of 100 psi for the same length of time. After separation of the solutions from catalyst and recovery of water washed and dried crystalline terephthalic acid products, these products are analyzed for their residual 4-formylbenzoic acid content. The catalyst effectiveness of the test catalyst is determined by dividing the residual 4-formylbenzoic acid content of product from use of standard catalyst by the residual 4-formylbenzoic acid content of the product from use of test catalyst. By this evaluation the catalyst effectiveness of copper and heat treated catalyst was found to have an effectiveness increase of 20 over the standard Pd/C catalyst.

The copper treated catalyst is more resistant against sulfur poisoning because the copper alloyed between palladium prevents palladium crystallites from growing to very large $Pd_4S$ crystallites that deactivate the Pd/C catalyst.

What is claimed is:

1. A process for the purification of a crude phthalic acid from catalytic liquid phase oxidation of a xylene by catalystic hydrogen treatment of aqueous solutions of said crude phthalic acid in the presence of a catalyst composite wherein said catalyst composite consists essentially of a carbon support having dispersed on its surface metallic palladium and a copper-palladium alloy wherein the total palladium is 0.1 to 10 weight percent of the composite, the copper content is in the weight range of 0.05 to 0.4 part per part of palladium and the palladium crystallites have a diagonal length below 35-50 A.

2. The process of claim 1 wherein the palladium content is 0.2-0.5 weight percent of the composite and the copper content is in the weight range of 0.1-0.3 part per part of palladium.

3. The process of claim 1 wherein the carbon support of the composite has a surface area to mass ratio in the range of 1,000-5,000 m²/g.

* * * * *